(12) United States Patent
Grimson et al.

(10) Patent No.: US 11,163,537 B1
(45) Date of Patent: Nov. 2, 2021

(54) TIERED APPLICATION PATTERN

(71) Applicant: MASTERCARD TECHNOLOGIES CANADA ULC, Vancouver (CA)

(72) Inventors: Marc Grimson, Vancouver (CA); Justin Fox, Pitt Meadows (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 0 days.

(21) Appl. No.: 16/864,329

(22) Filed: May 1, 2020

(51) Int. Cl.
*G06F 9/44* (2018.01)
*G06F 8/20* (2018.01)
*G06F 9/54* (2006.01)
*G06N 20/00* (2019.01)
*G06F 16/25* (2019.01)

(52) U.S. Cl.
CPC ............... *G06F 8/20* (2013.01); *G06F 9/542* (2013.01); *G06F 9/545* (2013.01); *G06F 16/252* (2019.01); *G06N 20/00* (2019.01)

(58) Field of Classification Search
CPC ........................................................ G06F 9/44
See application file for complete search history.

(56) References Cited

U.S. PATENT DOCUMENTS

| | | | |
|---|---|---|---|
| 2003/0177025 A1* | 9/2003 | Curkendall | A01K 11/007 340/573.3 |
| 2007/0124156 A1* | 5/2007 | Rice | G06Q 10/06 705/1.1 |
| 2011/0055318 A1* | 3/2011 | Srinivasan | G06F 9/542 709/203 |

* cited by examiner

*Primary Examiner* — Jae U Jeon
(74) *Attorney, Agent, or Firm* — Michael Best & Friedrich LLP

(57) ABSTRACT

Systems and methods for providing a development application having a tiered application pattern. One system includes an electronic processor configured to, with a gateway layer, receive and route a request to an application layer. In response to receiving the request from the gateway layer, the electronic processor is also configured to, with the application layer, perform application functionality corresponding to a function associated with the request. The application functionality includes generating an application event. The electronic processor is configured to receive, with an event stream layer, the application event from the application layer. The electronic processor is configured to, with the data processing layer, access the application event and process the application event. The electronic processor is configured to transmit, with the data processing layer, the processed application event to a data storage layer.

20 Claims, 6 Drawing Sheets

TIERED APPLICATION PATTERN

FIELD

Embodiments described herein relate to a tiered application pattern, and more particularly, to providing a development application having a tiered application pattern.

SUMMARY

Disparate and amalgamated systems that are traditionally used by teams to build software often result in insufficient data protection, access restrictions, and reliability. To solve these and other problems, embodiments described herein provide methods and systems for providing a development application having a tiered application pattern (for example, a five-tiered application pattern). The five-tier application pattern is an application design that helps businesses reliably develop and manage software at a global-scale. Usage of the five-tier application pattern in software solutions achieves a software development foundation that is global-scale, self-healing, and auto-scaling with enhanced availability. The embodiments described herein may also produce applications that, by design, are secure, private, data localized, or a combination thereof. Additionally, the five-tier application pattern described herein may support up to, for example, 10 million requests per second per uniform resource locator. This is a massive improvement (5000×) over usage of a gated microservice architecture with a standard three-tier application pattern. The five-tier application pattern may achieve these by implementing a communication workflow as described herein, which may utilize streams and queues. Alternatively or in addition, in some embodiments, for example, the tiered application pattern enables software applications to be designed around decoupled read and write paths to a data store to enable massively scaled global application services.

One embodiment provides a system for providing a development application having a tiered application pattern. The system includes an electronic processor configured to receive, with a gateway layer, a request from a user device, where the request is associated with a function. The electronic processor is also configured to route, with the gateway layer, the request to an application layer, where the application layer provides application functionality corresponding to the function. The electronic processor is also configured to, in response to receiving the request from the gateway layer, perform, with the application layer, the application functionality corresponding to the function, where the application functionality includes generating an application event. The electronic processor is also configured to receive, with an event stream layer, the application event from the application layer. The electronic processor is also configured to access, with a data processing layer, the application event and process, with the data processing layer, the application event. The electronic processor is also configured to transmit, with the data processing layer, the processed application event to a data storage layer, where the processed application event is stored in the data storage layer.

Another embodiments provides a method for providing a development application having a tiered application pattern. The method includes receiving, within a gateway layer with an electronic processor, a request from a user device, where the request is associated with a function. The method also includes routing, within the gateway layer with the electronic processor, the request to an application layer, where the application layer provides application functionality corresponding to the function. The method also includes, in response to receiving the request from the gateway layer, performing, within the application layer with the electronic processor, the application functionality corresponding to the function, where the application functionality includes generating an application event. The method also includes receiving, within an event stream layer with the electronic processor, the application event from the application layer. The method also includes accessing, within a data processing layer with the electronic processor, the application event. The method also includes processing, within the data processing layer with the electronic processor, the application event. The method also includes transmitting, within the data processing layer with the electronic processor, the processed application event to a data storage layer. The method also includes storing, within the data storage layer, the processed application event.

Yet another embodiment provides a non-transitory, computer-readable medium storing instructions that, when executed by an electronic processor, perform a set of functions. The set of functions includes receiving, within a gateway layer, a request from a user device, wherein the request is associated with a function. The set of functions also includes routing, within the gateway layer, the request to an application layer, where the application layer provides application functionality corresponding to the function. In response to receiving the request from the gateway layer, the set of functions also includes performing, within the application layer, the application functionality corresponding to the function, where the application functionality includes generating an application event. The set of functions also includes receiving, within an event stream layer, the application event from the application layer. The set of functions also includes accessing, within a data processing layer, the application event from an event storage. The set of functions also includes processing, within the data processing layer, the application event. The Set of functions also includes transmitting, within the data processing layer, the processed application event to a data storage layer, where the processed application event is stored in the data storage layer.

Other aspects of the embodiments described herein will become apparent by consideration of the detailed description and accompanying drawings.

Other aspects of the embodiments described herein will become apparent by consideration of the detailed description.

DETAILED DESCRIPTION OF THE EMBODIMENTS

Before embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including direct connections, wireless connections, etc.

A plurality of hardware and software based devices, as well as a plurality of different structural components may be utilized to implement the embodiments described herein. In addition, embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments described herein may be implemented in software (for example, stored on non-transitory computer-readable medium) executable by one or more processors. As such, it should be noted that a plurality of hardware and software based devices, as well as a plurality of different structural components, may be utilized to implement the embodiments described herein. For example, "mobile device," "computing device," and "server" as described in the specification may include one or more electronic processors, one or more memory modules including non-transitory computer-readable medium, one or more input/output interfaces, and various connections (for example, a system bus) connecting the components.

Figure 1:
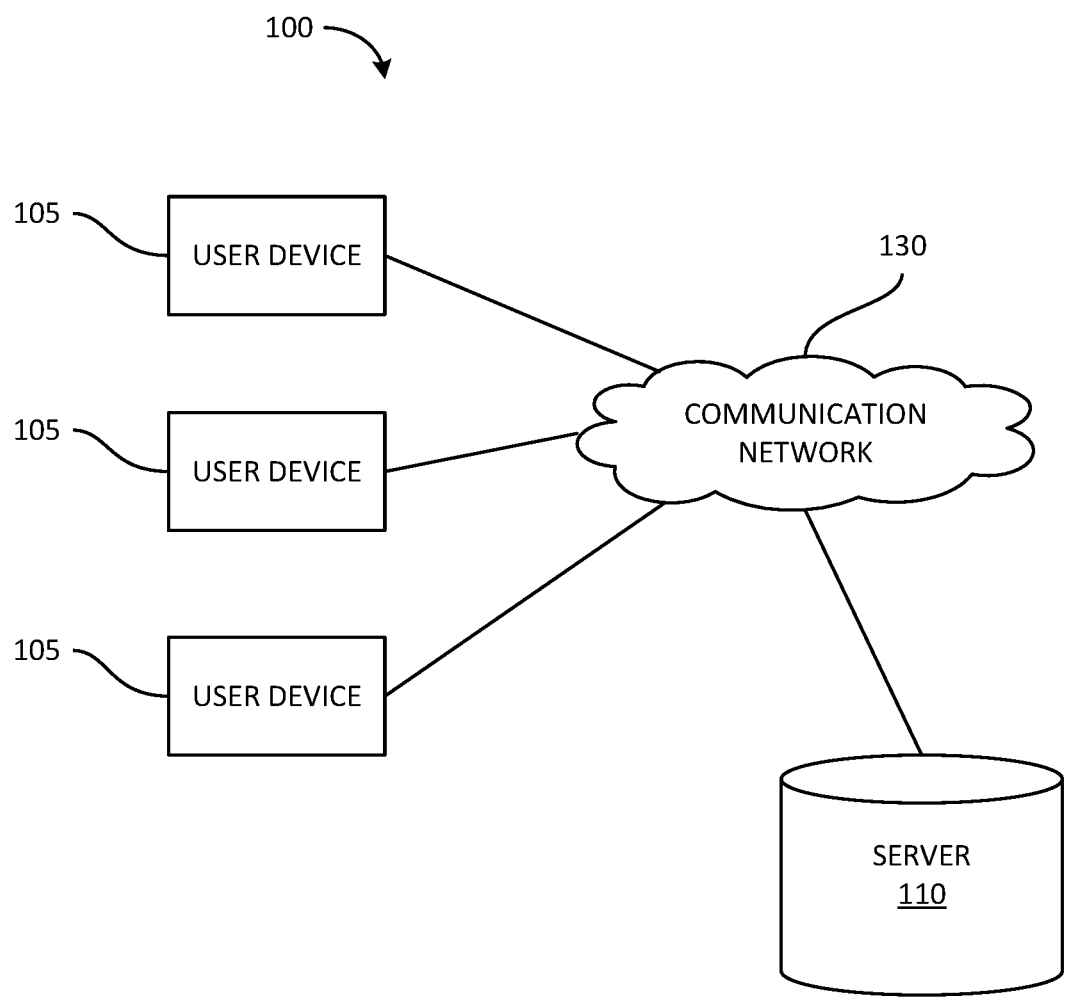
FIG. 1 is a block diagram of a system for providing a development application having a tiered application pattern according to some embodiments.

FIG. 1 is a block diagram of a system 100 for providing a development application having a tiered application pattern according to some embodiments. In the example shown, the system 100 includes a plurality of user devices 105 (referred to herein collectively as "the user devices 105" and individually as "the user device 105") and a server 110. In some embodiments, the system 100 includes fewer, additional, or different components than illustrated in FIG. 1. The system 100 may include a different number of user devices and the four user devices 105 included in FIG. 1 are purely for illustrative purposes.

The server 110 and the user devices 105 are communicatively coupled via a communication network 130. The communication network 130 is an electronic communications network including wireless and wired connections. Portions of the communication network 130 may be implemented using a wide area network, such as the Internet, a local area network, such as a Bluetooth™ network or Wi-Fi, and combinations or derivatives thereof. Alternatively or in addition, in some embodiments, components of the system 100 communicate directly with each other as compared to communicating through the communication network 130. Also, in some embodiments, the components of the system 100 communicate through one or more intermediary devices not illustrated in FIG. 1.

The server 110 is a computing device, which may host or provide a development application for developing and managing a software application. For example, in some embodiments, the server 110 is a cloud computing service or platform server for software development and management. Alternatively, in some embodiments, the server 110 may be a server that communicates with a cloud computing service or platform (for example, AZURE™ provided by Microsoft Corporation or AWS™ provided by Amazon Web Services, Inc.) for developing a software application.

Figure 2:
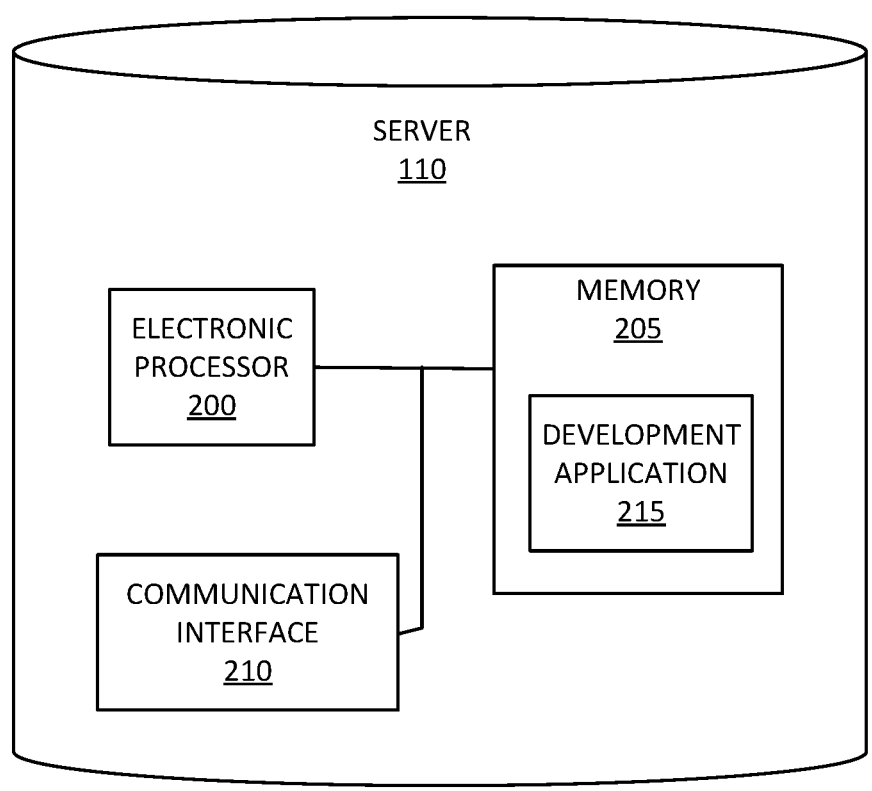
FIG. 2 is a block diagram of a server of the system of FIG. 1 according to some embodiments.

As illustrated in FIG. 2, the server 110 includes an electronic processor 200, a memory 205, and a communication interface 210. The electronic processor 200, the memory 205, and the communication interface 210 communicate wirelessly, over one or more communication lines or buses, or a combination thereof. The server 110 may include additional components than those illustrated in FIG. 2 in various configurations. The server 110 may also perform additional functionality other than the functionality described herein. Also, the functionality (or a portion thereof) described herein as being performed by the server 110 may be distributed among multiple devices, such as multiple servers included in a cloud service environment. For example, in some embodiments, the server 110 is part of a computing network, such as a distributed computing network, a cloud computing service, or the like. In addition, in some embodiments, one or more of the user devices 105 may be configured to perform all or a portion of the functionality described herein as being performed by the server 110.

The electronic processor 200 can include a microprocessor, an application-specific integrated circuit (ASIC), or another suitable electronic device for processing data. The memory 205 can include a non-transitory computer-readable medium, such as read-only memory ("ROM"), random access memory ("RAM") (for example, dynamic RAM ("DRAM"), synchronous DRAM ("SDRAM"), and the like), electrically erasable programmable read-only memory ("EEPROM"), flash memory, a hard disk, a secure digital ("SD") card, another suitable memory device, or a combination thereof. The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein. For example, as illustrated in FIG. 2, the memory 205 may store a development application 215.

The communication interface 210 allows the server 110 to communicate with devices external to the server 110. For example, as illustrated in FIG. 1, the server 110 may communicate with one or more of the user devices 105 through the communication interface 210. In particular, the communication interface 210 may include a port for receiving a wired connection to an external device (for example, a universal serial bus ("USB") cable and the like), a transceiver for establishing a wireless connection to an external device (for example, over one or more communication networks 120, such as the Internet, local area network ("LAN"), a wide area network ("WAN"), and the like), or a combination thereof.

The user device 105 is also a computing device and may include a desktop computer, a terminal, a workstation, a laptop computer, a tablet computer, a smart watch or other wearable, a smart television or whiteboard, or the like. Although not illustrated, the user device 105 may include similar components as the server 110 (an electronic processor, a memory, and a communication interface). The user device 105 may also include a human-machine interface. The human-machine interface may include one or more input devices, one or more output devices, or a combination thereof. Accordingly, in some embodiments, the human-machine interface allows a user to interact with (for example, provide input to and receive output from) the user device 105. For example, the human-machine interface may include a keyboard, a cursor-control device (for example, a mouse), a touch screen, a scroll ball, a mechanical button, a display device (for example, a liquid crystal display ("LCD")), a printer, a speaker, a microphone, or a combination thereof. In some embodiments, the user device 105 is a customer device or server that is part of a computing network, such as a distributed computing network, a cloud computing service, or the like, that leverages or accesses the tired application pattern. Alternatively or in addition, the user device 105 may be a customer device or server that accesses an application (having a five-tiered application design) as a customer or user of the application.

A user (for example, a software developer) may use the user device 105 to develop and manage an application (for example, an ecommerce application). For example, the user may access the development application 215 (through a browser application or a dedicated application stored on the user device 105 that communicates with the server 110) and interact with the development application 215 via the human-machine interface associated with the user device 105.

Figure 3:
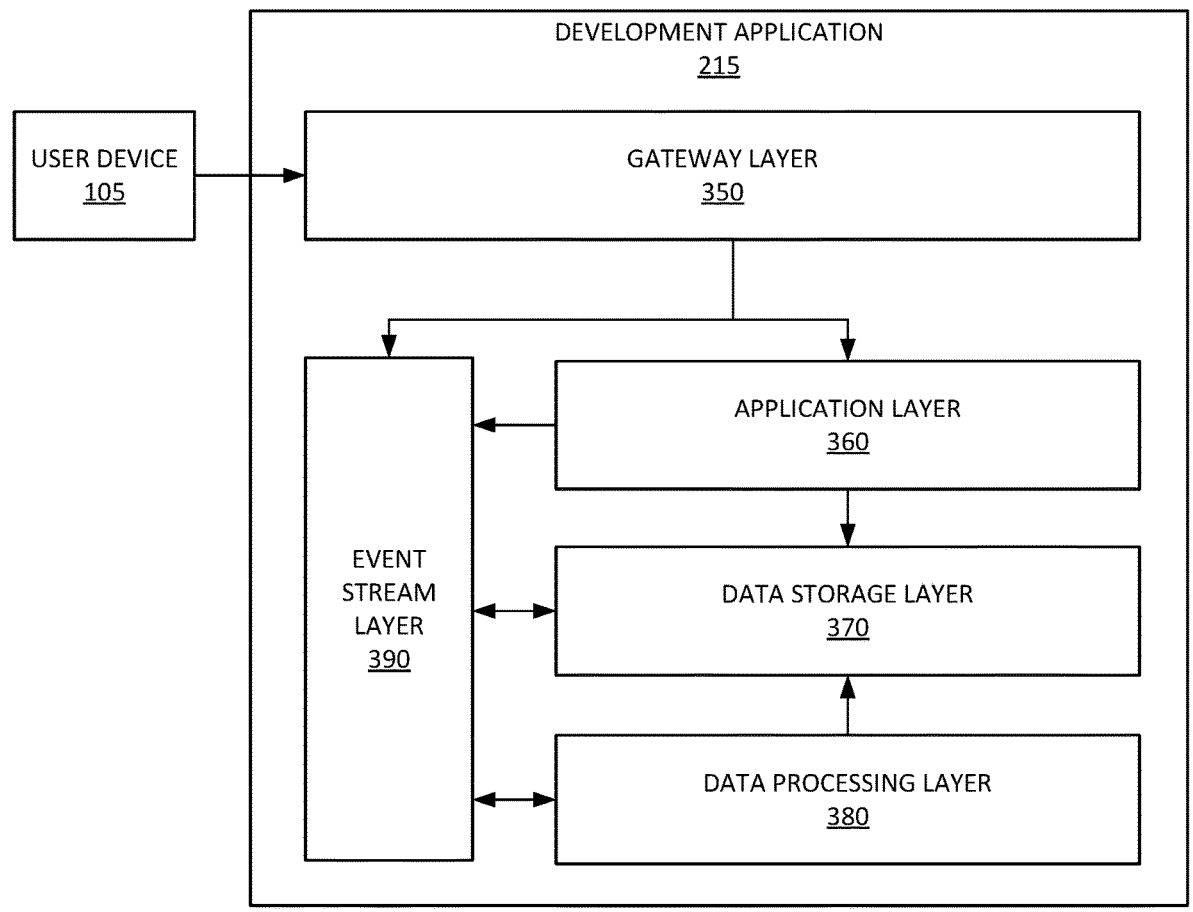
FIG. 3 is a block diagram illustrating a five-tier application pattern for the development application of FIG. 1 according to some embodiments.

In some embodiments, the development application 215 has a tiered application pattern. In the illustrated example, the development application 215 has a five-tier application pattern. In other words, the development application 215 may designate five application layers. For example, FIG. 3 is a block diagram illustrating a five-tier application pattern of the development application 215 according to some embodiments. As illustrated in FIG. 3, the development application 215 includes a gateway layer 350, an application layer 360, a data storage layer 370, a data processing layer 380, and an event stream layer 390. In some embodiments, the development application 215 may include additional, fewer, or different application layers (or tiers) than illustrated in FIG. 3 in various configurations.

As noted above, in some embodiments, the functionality (or a portion thereof) of the server 110 may be distributed among multiple devices or servers. Accordingly, in some embodiments, the system 100 includes multiple servers 110, where each server provides a layer described herein as being provided by the server 110. For example, a first server (for example, a gateway server) may provide the gateway layer 350, a second server (for example, an application server) may provide the application layer 360, a third server (for example, a data storage server) may provide the data storage layer 370, a fourth server (for example, a data processing server) may provide the data processing layer 380, and a fifth server (for example, an event stream server) may provide the event stream layer 390.

The gateway layer 350 functions as an entry point to the development application 215. In some embodiments, the gateway layer 350 serves as the only publically accessible entry point to the development application 215. As such, the gateway layer 350 is configured to receive one or more requests from the user devices 105 and process the received requests, and, ultimately, trigger application functionality (via the other layers of the tiered application pattern). Accordingly, in some embodiments, the gateway layer 350 contains or functions as an application programmable interface (API) gateway. The gateway layer 350 may define a type of request an application may handle, a type of parameter, a response body, an error code, a failure situation, and the like. In some embodiments, the gateway layer 350 includes multiple technology components incorporated into a single layer that serves a functional purpose. For example, the gateway layer 350 may include technology components that implement edge security technology, enforce encryption protocols, and the like. In some embodiments, the gateway layer 350 implements request transformation templates to directly integrate with select data storage and queue resources as, for example, an optimization that may bypass a need for building and maintaining application code. As a result of this optimization, application cost may be reduced where viable. As seen in FIG. 3, in some embodiments, the gateway layer 350 interacts directly with the application layer 360, the event stream layer 390, or a combination thereof.

The application layer 360 contains application or product functionality. In other words, the application layer 360 contains the business logic for handling incoming requests from the gateway layer 350. Alternatively or in addition, in some embodiments, the application layer 360 contains template functionality and security. Further, in some embodiments, the application layer 360 implements support for one or more software endpoints defined in an OpenAPI Specification used to define the gateway layer 350. As seen in FIG. 3, in some embodiments, the application layer 360 interacts directly with the event stream layer 390, the data storage layer 370, or a combination thereof.

The data storage layer 370 contains, for example, one or more managed databases, file systems, alternative databases, machine learning model databases, artificial intelligence model databases, or a combination thereof. For example, the application layer 360 may interact with the data storage layer 370 by reading (or accessing) data from the data storage layer 370. Alternatively or in addition, in some embodiments, the application layer 370 accesses one or more models stored in the machine learning model database, the artificial intelligence model database, or a combination thereof. The application layer 370 may use the accessed one or more models to process a request (for example, perform application functionality associated with the request). In some embodiments, the application functionality performed by the application layer 370 is improved by accessing and using the one or more models.

The event stream layer 390 provides event stream processing. In other words, application events are streamed into the event stream layer 390 (for example, from the application layer 360). The application events streamed into the event stream layer 390 are stored until each application event is processed by the data processing layer 380. As seen in FIG. 3, in some embodiments, the event stream layer 390 interacts directly with the data storage layer 370, the data processing layer 380, or a combination thereof.

As part of a normal operation of the application layer 360, the five-tier application pattern may encourage the application layer 360 to read from the data storage layer 370 while application writes (i.e., application events) are pushed (or streamed) to event streams (for example, the event stream layer 390) for eventual processing. Accordingly, in some embodiments, the tiered application pattern enables software applications to be designed around the concept of decoupled read and write paths to a data store to enable massively scaled global application services.

The data processing layer 380 is configured to process one or more application events from the event stream layer 390. For example, in some embodiments, the data processing layer 380 is configured to process the one or more application events using an extract, transform, and load (ETL) procedure. The data processing layer 380 may support online application event processing, offline application event processing, or a combination thereof. In some embodiments, the data processing layer 380 utilizes the notion of notifications and queues to create fan out capabilities. For example, when application events are fanned out, the application events may be processed multiple times by different compute functions. As seen in FIG. 3, in some embodiments, the data processing layer 380 interacts directly with the data storage layer 370, the event stream layer 390, or a combination thereof. For example, the data processing layer 380 may interact with the data storage layer 370 by updating and manipulating one or more databases contained within the data storage layer 370.

Figure 4:
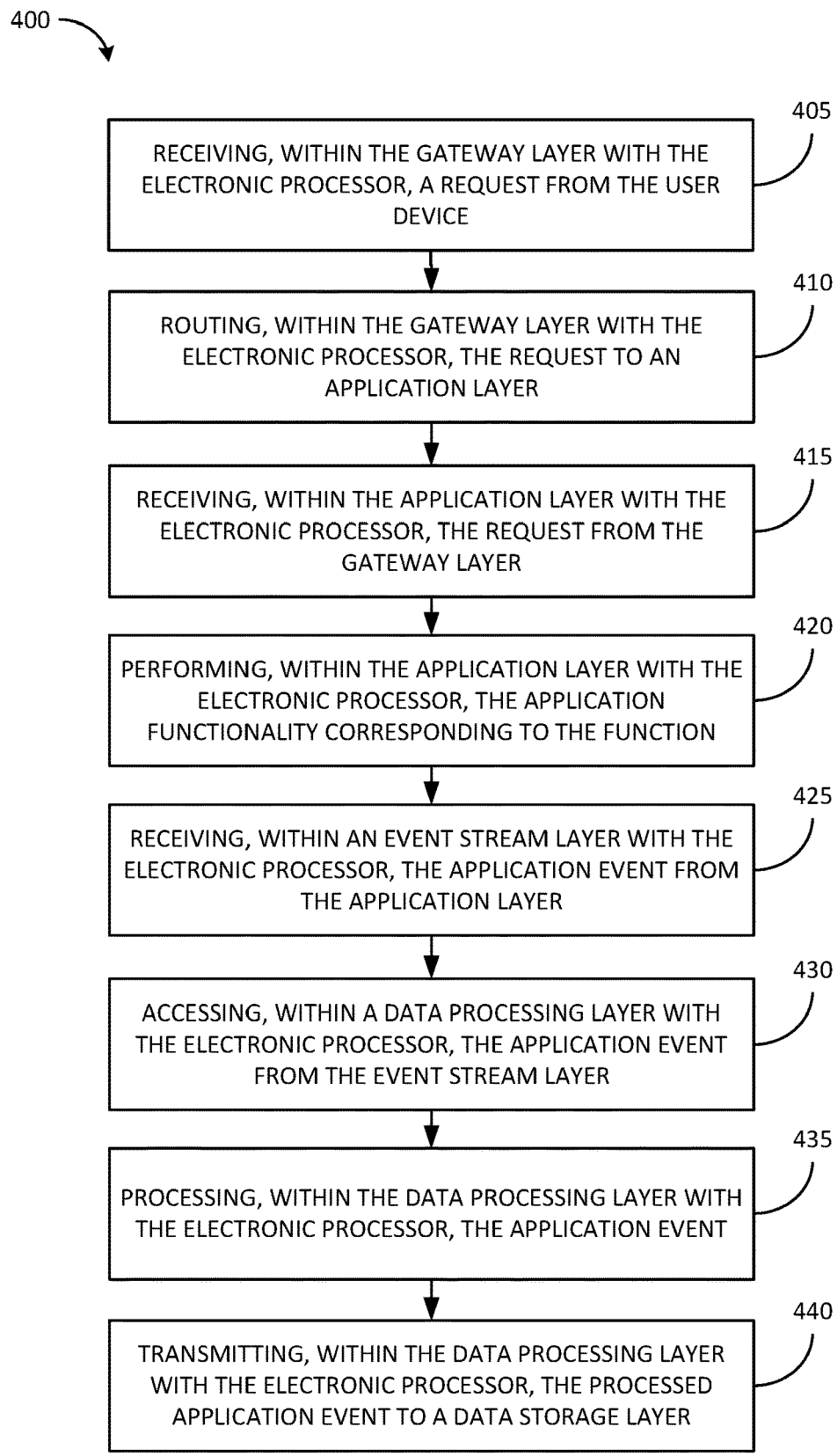
FIG. 4 is a flow chart of a method of providing a development application having a tiered application pattern using the system of FIG. 1 according to some embodiments.
Figure 5:
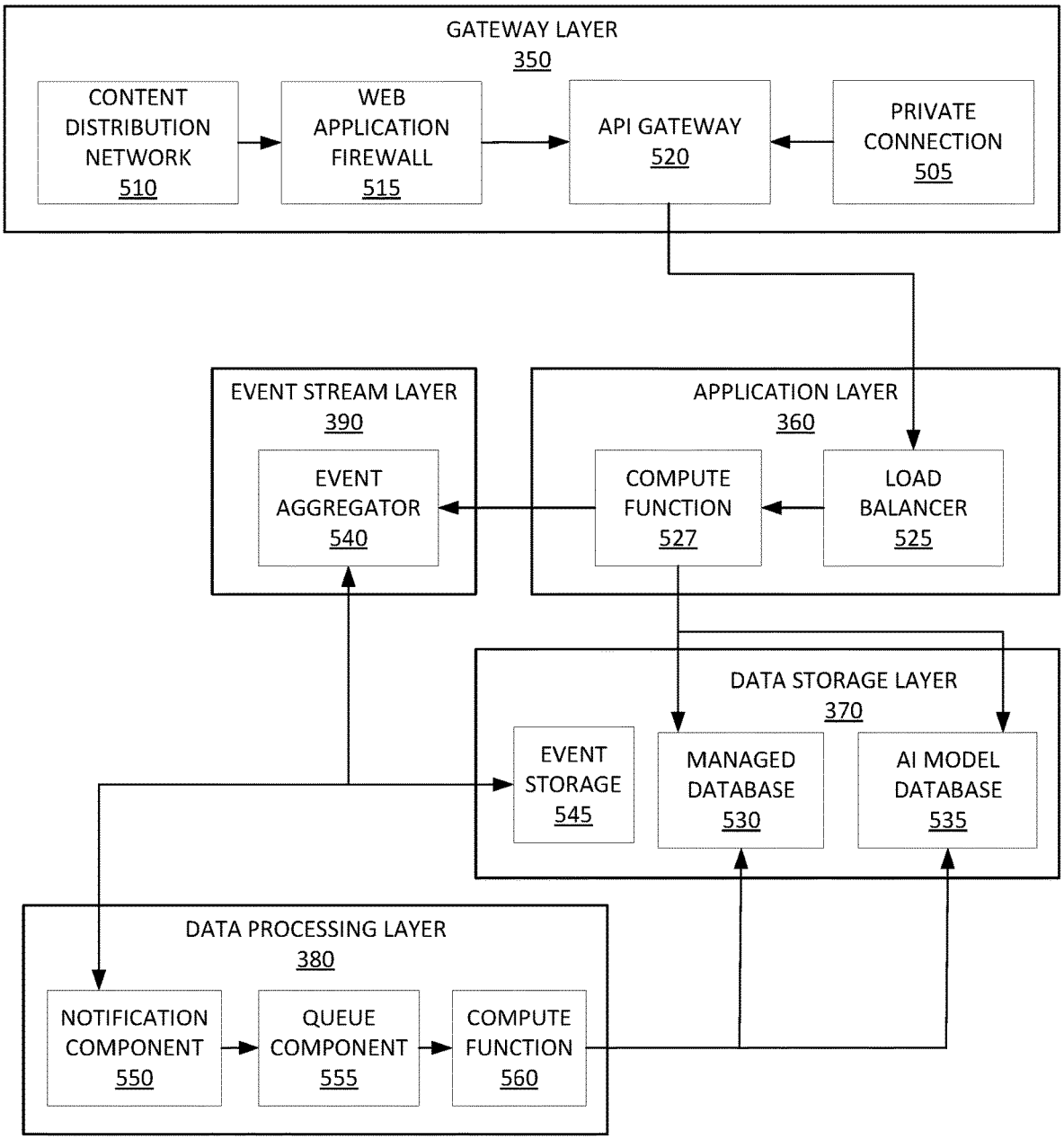
FIG. 5 is a block diagram illustrating an exemplary workflow with respect to the five-tier application pattern of FIG. 2.

FIG. 4 is a flowchart illustrating a method 400 for providing a development application having a tiered application pattern (for example, the development application 215) according to some embodiments. The method 400 is described here as being performed by the server 110 (the electronic processor 200 executing instructions). However, as noted above, the functionality performed by the server 110 (or a portion thereof) may be performed by other devices, including, for example, one or more of the user devices 105 (via an electronic processor executing instructions). The method 400 of FIG. 4 will be described with reference to FIG. 5. FIG. 5 is a block diagram illustrating an exemplary workflow with respect to the five-tier application pattern of FIG. 2.

As illustrated in FIG. 4, the method 400 includes receiving, within the gateway layer 350 with the electronic processor 200, a request from the user device 105 (at block 405). A request may include, for example, an authentication request, a retrieval request, an authorization request, a reporting request, a data processing request, and the like. In some embodiments, the request is associated with a user (for example, a customer) interacting with a developed application having a five-tiered application pattern. In other embodiments, the request is associated with a user (for example, a software developer) that is developing or managing an application, such as an ecommerce application. As noted above, the gateway layer 350 serves as an entry point to the software development application 215. As such, the gateway layer 350 (via the electronic processor 200) is configured to receive one or more requests from the user devices 105. In some embodiments, the gateway layer 350 includes multiple technology components incorporated into a single layer that serves a functional purpose. In response to receiving the request form the user device 105, the gateway layer 350 (via the electronic processor 200) processes the request to determine routing for the request.

As seen in FIG. 5, in some embodiments, the gateway layer 350 (via the electronic processor 200) receives the request from the user device 105 through a private connection 505 (for example, a virtual private network (VPN)). However, in some embodiments, the gateway layer 350 receives the request through a public connection (for example, public internet). Alternatively or in addition, the gateway layer 350 (via the electronic processor 200) may receive the request from the user device 105 through a content distribution network 510. Alternatively or in addition, the gateway layer 350 may include technology components that implement edge security technology, enforce encryption protocols, and the like (for example, a web application firewall 515). For example, as illustrated in FIG. 5, the gateway layer 350 may include the web application firewall 515.

After receiving the request from the user device 105, the gateway layer 350 (via the electronic processor 200) routes (or transmits) the request to the application layer 360 (at block 410). As seen in FIG. 5, in some embodiments, the gateway layer 350 includes an application programming interface (API) gateway 520. In such embodiments, the API gateway 520 (via the electronic processor 200) processes and routes the request to the application layer 360.

Figure 6:
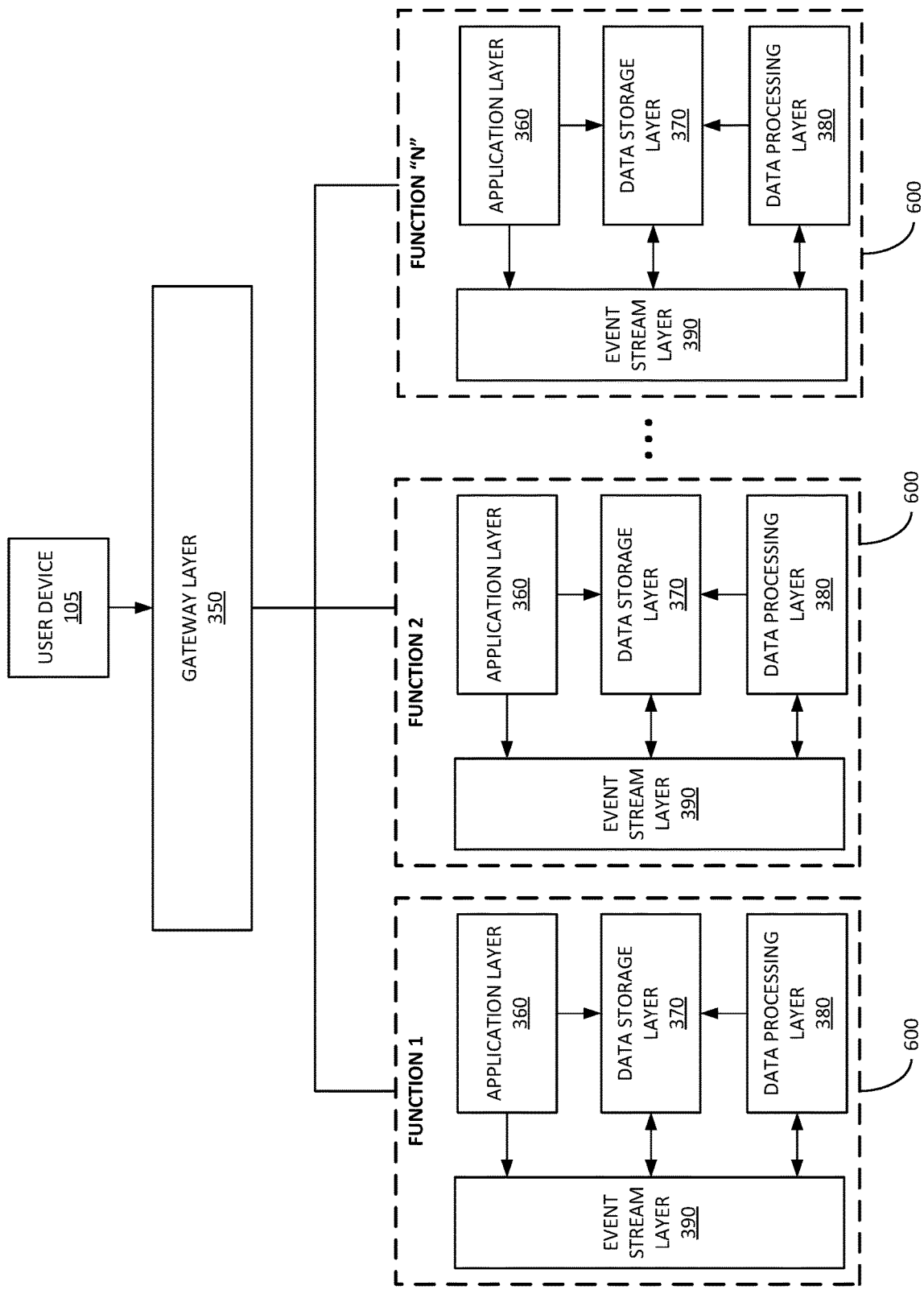
FIG. 6 is a block diagram illustrating a plurality of service modules according to some embodiments.

In some embodiments, the API gateway 520 (via the electronic processor 200) processes the request to determine a function (or functionality) associated with the request. A function associated with the request may include, for example, an event retrieval function, an authentication function, an authorization function, a reporting function, a data processing function, and the like. After the API gateway 520 determines a function associated with the request, the API gateway 520 (via the electronic processor 200) routes the request based on the determined function. For example, as illustrated in FIG. 6, the API gateway 520 may route the request to one or more service modules 600. Each service module 600 supports or provides a specific function (or functionality). In some embodiments, each service module 600 provides a microservice, a nanoservice, and the like. As seen in FIG. 6, each service module 600 includes an application layer 360, a data storage layer 370, a data processing layer 380, and an event stream layer 390, where the application layer 360, the data storage layer 370, the data processing layer 380, and the event stream layer 390 support the specific function of the service module 600. For example, when the API gateway 520 determines that the function associated with the request is an authentication function, the API gateway 520 routes the request (and any associated data) to a service module 600 that supports or provides an authentication function. Accordingly, in some embodiments, the gateway layer 350 (via the electronic processor 200) routes the request to an application layer that provides application functionality corresponding to the function associated with the request (for example, the application layer 360).

Returning to FIG. 4, the method 400 includes receiving, within the application layer 360 with the electronic processor 200, the request from the gateway layer 350 (at block 415). In some embodiments, the application layer 360 includes a load balancer 525, as illustrated in FIG. 5. For example, when the application layer 360 receives multiple requests (for example, a first request, a second request, a third request, and the like), the load balancer 525 provides functionality that improves the distribution of workloads relating to those requests.

In in response to receiving the request from the gateway layer 350 (at block 415), the application layer 360 (via the electronic processor 200) performs the application functionality corresponding to the function (at block 420). In other words, application functionality associated with the application layer 360 is triggered (via the electronic processor 200 executing application functionality associated with the application layer 360). The triggering of the application functionality associated with the application layer 360 is depicted by a compute component 527 in FIG. 5.

In some embodiments, the receipt of the request triggers the application layer 360 (via the electronic processor 200) to interact with the data storage layer 370. The application layer 360 may interact with the data storage layer 370 by reading (or accessing) stored data from the data storage layer 370. In some embodiments, the application layer 360 reads data from the data storage layer 370 and provides (or transmits) the read data as an output (or response) to the user device 105 (for example, as a response body). For example, the application layer 360 may access the data storage layer 307 to read a processed application event, a machine learning model, an artificial intelligence model, and the like. As noted above, the data storage layer 370 may include a managed database, a file system, a machine learning model database, an artificial intelligence model database, an alternative data storage technology, or a combination thereof. For example, as illustrated in FIG. 5, the data storage layer 370 includes a managed database 530 and an artificial intelligence model database 535. Accordingly, in the illustrated example, the application layer 360 (via the electronic processor 200 executing application functionality) may interact with the data storage layer 370 by reading (or accessing) data from the managed database 530, the artificial intelligence model database 535, or a combination thereof.

Alternatively or in addition, in some embodiments, the receipt of the request triggers the application layer 360 (via the electronic processor 200) to interact with the event stream layer 390. The application layer 360 interacts with the event stream layer 390 by writing (via the electronic processor 200) an application event (for example, an application write) to the event stream layer 390. In some embodiments, the application layer 360 includes the data read from the data storage layer 370 as part of the application event. For example, as illustrated in FIG. 4, the method 400 also includes receiving, within the event stream layer 390 (via the electronic processor 200), the application event from the application layer (at block 425). Accordingly, in some embodiments, the application layer 360 (via the electronic processor 200) generates an application event based on the request and transmits the application event to the event stream layer 390 for event aggregation. Alternatively or in addition, the event stream layer 390 provides event aggregation functionality. For example, as illustrated in FIG. 5, the event stream layer 390 includes an event aggregator 540. The event aggregator 540 aggregates (or combines) application events received from the application layer 360. As seen in FIG. 5, the event stream layer 390 may store application events in an event storage 545.

As seen in FIG. 4, the method 400 also includes accessing, within the data processing layer 380 (via the electronic processor 200), the application event from the event storage 545 (at block 430). The method 400 also includes processing, within the data processing layer 380 (via the electronic processor 200), the application event (at block 435). In other words, the data processing layer 380 (via the electronic processor 200) accesses one or more application events from the event storage 545 for processing. In some embodiments, the data processing layer 380 (via the electronic processor 200) processes the one or more application events using an extract, transform, and load (ETL) procedure. For example, the data processing layer 380 (via the electronic processor) extracts an application event from the event storage 545, transforms the application event (for example, into a different format or structure), and loads the transformed application event to, for example, the data storage layer 370.

As noted above, in some embodiments, the data processing layer 380 utilizes the notion of notifications and queues to create fan out capabilities. For example, when application events are fanned out, the application events may be processed multiple times by different compute functions. Accordingly, as seen in FIG. 5, the data processing layer 380 may include one or more notification components 550, one or more queue components 555, one or more compute functions 560, or a combination thereof.

After processing the application event (at block 435), the data processing layer 380 (via the electronic processor 200) transmits the processed application event to the data storage layer 370 (at block 440). As noted above, in some embodiments, the data processing layer 380 (via the electronic processor 200) updates and maintains one or more databases included in the data storage layer 370. For example, as illustrated in FIG. 5, the data processing layer 380 may update and maintain (manage) the managed database 530. Accordingly, the processed application event transmitted to the data storage layer 370 by the data processing layer 380 (via the electronic processor 200) may be stored in, for example, the managed database 530. In some embodiments, the electronic processor 200 transmits a response (for example, a response body) to the request. For example, after the application event is accessed and processed by the data processing layer 380 (via the electronic processor 200), a response body is returned to the user device 105 that the request was originally received from.

Thus, the embodiments described herein provide, among other things, methods and systems for providing a development application having a tiered application pattern. Various features and advantages of the invention are set forth in the following claims.

What is claimed is:
1. A system for providing a development application having a tiered application pattern, the system comprising:
   an electronic processor configured to
      receive, with a gateway layer, a request from a user device, wherein the request is associated with a function,
      route, with the gateway layer, the request to an application layer, wherein the application layer provides application functionality corresponding to the function,
      in response to receiving the request from the gateway layer, perform, with the application layer, the application functionality corresponding to the function, wherein the application functionality includes generating an application event,
      receive, with an event stream layer, the application event from the application layer,
      access, with a data processing layer, the application event,
      process, with the data processing layer, the application event, and
      transmit, with the data processing layer, the processed application event to a data storage layer, wherein the processed application event is stored in the data storage layer.
2. The system of claim 1, wherein the data storage layer includes at least one selected from a group consisting of a managed database, a file system, an alternative data storage technology, a machine learning model database, and an artificial intelligence model database.

3. The system of claim 1, wherein the gateway layer includes an application programming interface (API) gateway.

4. The system of claim 1, wherein the electronic processor is further configured to access, with the application layer, data stored in the data storage layer.

5. The system of claim 4, wherein the data stored in the data storage layer includes the processed application event.

6. The system of claim 4, wherein the data stored in the data storage layer includes at least one selected from a group consisting of a machine learning model and an artificial intelligence model.

7. The system of claim 1, wherein the electronic processor is configured to process, with the data processing layer, the application event by
 extracting the application event from the event storage,
 transforming the application event, and
 loading the transformed application event to the data storage layer.

8. The system of claim 1, wherein the application layer includes a load balancer configured to manage a distribution of workloads associated with the request received by the application layer.

9. The system of claim 1, wherein the event stream layer includes an event aggregator configured to aggregate incoming application events.

10. The system of claim 1, wherein the application functionality corresponds to at least one selected from a group consisting of an event retrieval function, an authentication function, an authorization function, a data processing function, and a reporting function.

11. A method for providing a development application having a tiered application pattern, the method comprising:
 receiving, within a gateway layer with an electronic processor, a request from a user device, wherein the request is associated with a function;
 routing, within the gateway layer with the electronic processor, the request to an application layer, wherein the application layer provides application functionality corresponding to the function;
 in response to receiving the request from the gateway layer, performing, within the application layer with the electronic processor, the application functionality corresponding to the function, wherein the application functionality includes generating an application event;
 receiving, within an event stream layer with the electronic processor, the application event from the application layer;
 accessing, within a data processing layer with the electronic processor, the application event;
 processing, within the data processing layer with the electronic processor, the application event;
 transmitting, within the data processing layer with the electronic processor, the processed application event to a data storage layer; and
 storing, within the data storage layer, the processed application event.

12. The method of claim 11, further comprising:
 accessing, with the application layer, data stored in the data storage layer.

13. The method of claim 12, wherein accessing, with the application layer, data stored in the data storage layer includes accessing, with the application layer, the processed application event.

14. The method of claim 12, wherein accessing, with the application layer, data stored in the data storage layer includes accessing, with the application layer, at least one selected from a group consisting of a machine learning model and an artificial intelligence model.

15. The method of claim 11, wherein processing, with the data processing layer, the application event includes
 extracting, with the data processing layer, the application event from the event storage,
 transforming, with the data processing layer, the application event, and
 loading, with the data processing layer, the transformed application event to the data storage layer.

16. A non-transitory, computer-readable medium storing instructions that, when executed by an electronic processor, perform a set of functions, the set of functions comprising:
 receiving, within a gateway layer, a request from a user device, wherein the request is associated with a function;
 routing, within the gateway layer, the request to an application layer, wherein the application layer provides application functionality corresponding to the function;
 in response to receiving the request from the gateway layer, performing, within the application layer, the application functionality corresponding to the function, wherein the application functionality includes generating an application event;
 receiving, within an event stream layer, the application event from the application layer;
 accessing, within a data processing layer, the application event from an event storage;
 processing, within the data processing layer, the application event; and
 transmitting, within the data processing layer, the processed application event to a data storage layer, wherein the processed application event is stored in the data storage layer.

17. The computer-readable medium of claim 16, wherein the set of functions further comprises: accessing, with the application layer, data stored in the data storage layer.

18. The computer-readable medium of claim 17, wherein accessing, with the application layer, data stored in the data storage layer includes accessing, with the application layer, the processed application event.

19. The computer-readable medium of claim 17, wherein accessing, with the application layer, data stored in the data storage layer includes accessing, with the application layer, at least one selected from a group consisting of a machine learning model and an artificial intelligence model.

20. The computer-readable medium of claim 16, wherein processing, with the data processing layer, the application event includes:
 extracting, with the data processing layer, the application event from the event storage, transforming, with the data processing layer, the application event, and loading, with the data processing layer, the transformed application event to the data storage layer.

* * * * *